Oct. 13, 1942. H. NUTT ET AL 2,299,028
CLUTCH PLATE
Filed July 3, 1939 2 Sheets-Sheet 1
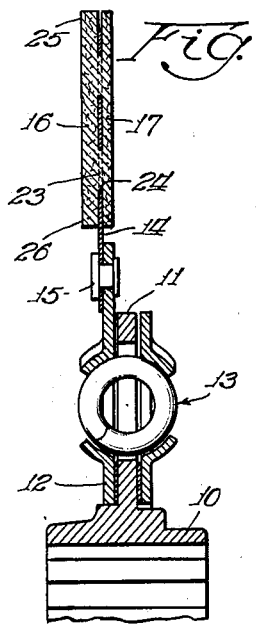
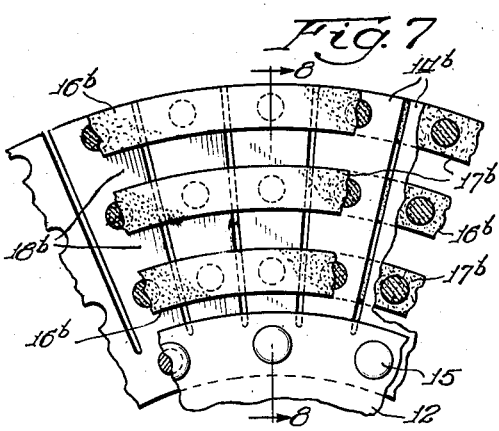
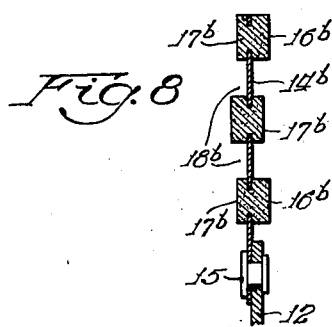
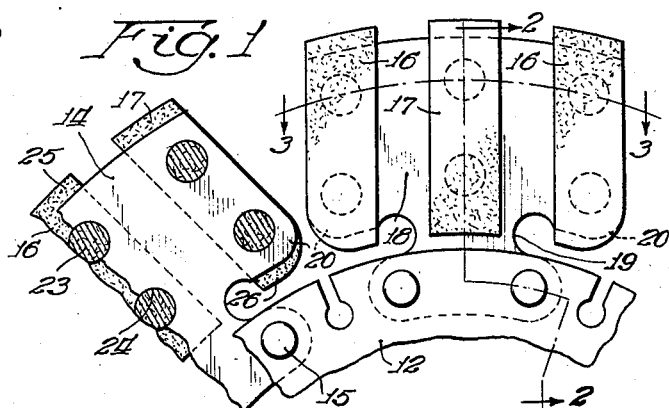
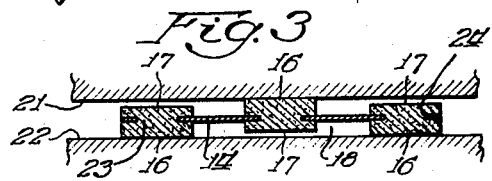
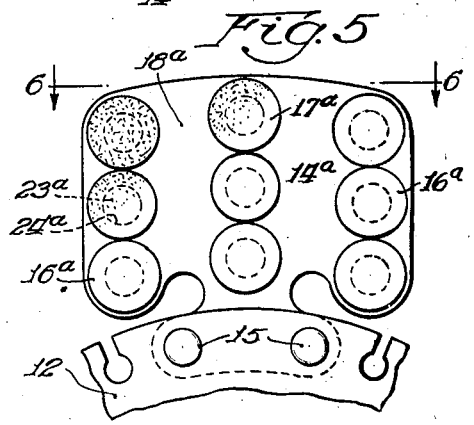
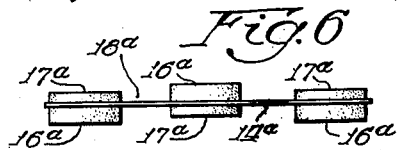
Inventors:
Harold Nutt and
Harold V. Reed.
By: Edward C. Gritzbaugh
Atty.

Oct. 13, 1942. H. NUTT ET AL 2,299,028
CLUTCH PLATE
Filed July 3, 1939 2 Sheets-Sheet 2
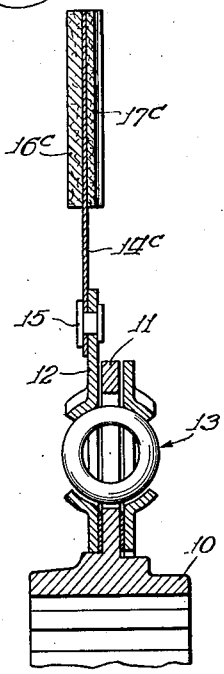
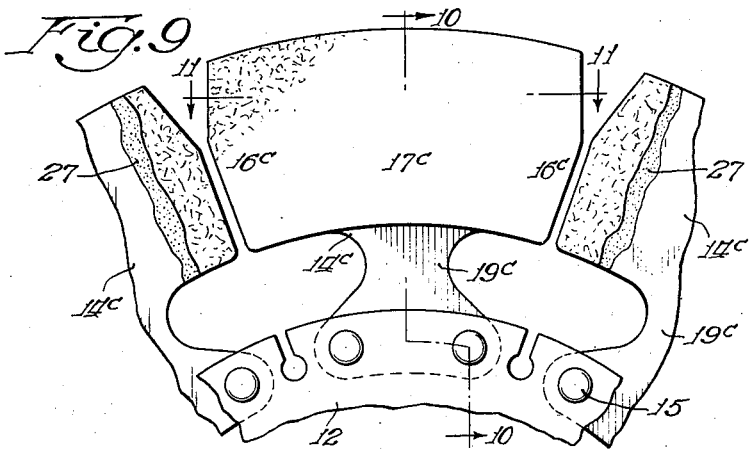
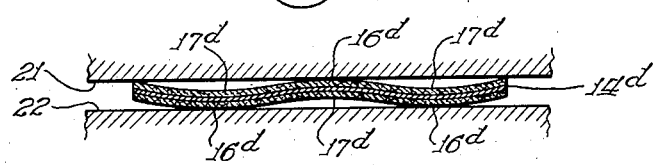
Inventors:
Harold Nutt and
Harold V. Reed.
By: Edward C. Grigsbaugh
Atty.

Patented Oct. 13, 1942

2,299,028

UNITED STATES PATENT OFFICE 2,299,028

CLUTCH PLATE

Harold Nutt and Harold V. Reed, Chicago, Ill., assignors to Borg-Warner Corporation, Chicago, Ill., a corporation of Illinois Application July 3, 1939, Serial No. 282,656

10 Claims. (Cl. 192—107)

This invention relates to driven plates for friction clutches of the type employed in motor vehicles, and has as its general object to provide a driven plate of the cushioned engagement type wherein improvement in operation and durability, as well as economies in construction, are effected.

Another object of the invention is to secure the aforestated advantages in a clutch plate wherein the cushion elements are of thin, light-weight material so as to have minimum torsional inertia and are supported upon a central mounting disc of relatively heavy non-yielding material extending fairly close to the inner periphery of the facings, but not extending between the facings.

To this end, the invention contemplates a driven plate wherein the facings are in the form of independent pads, each carried by one of a series of circumferentially separated cushion elements of thin, light-weight sheet metal, whereby the clutch plate as a whole comprises an annular series of circumferentially separated clutch sectors, each adapted to yield to compression between a pair of flat faced coacting clutch members, without affecting or being affected by the yielding action of adjacent sectors. Such independent yielding action in the respective sectors gives the plate as a whole a greater flexibility in adapting itself to the clutch members between which it is compressed, and makes the cushioning action more sensitive in proportion to the torsional strength of those portions of the cushion elements which connect them to the heavy mounting discs of the plate.

The invention further aims to effect economy by providing a clutch plate wherein the cushion elements need not be initially distorted axially in order to serve as cushioning means, but may on the contrary, be perfectly flat and disposed in a common plane, when in unstressed condition. With such a cushion, cushioning action is obtained by forming and arranging the facings with regions of varying thickness so as to present "high" regions of friction surface adapted to be engaged at the commencement of clutching action, and "low" regions of friction surface that do not become engaged until the cushions have been distorted out of their flat plane.

Further carrying out the general object of achieving economy, the facing elements are, in the preferred form of the invention, in the form of separate pads or strips that are alternately thick and thin relative to the plane of the cushion, the thicker pads being engaged initially and the thinner pads becoming engaged after distortion of the cushion has taken place.

A still further object of the invention, which is carried out in this arrangement, is to provide a clutch plate wherein only a portion of the friction surface is engaged initially, and yet which does not require the flexing of the friction facing in order to bring the remainder of the friction surface into engagement.

Another object of the invention is to provide a clutch plate having varying thickness regions of spacing on a flat cushion, wherein cushioning action is facilitated by arranging the facing so that the variation in thickness occurs in a circumferential direction and the thickness in a radial direction, at any given line of section, is uniform. The cushions are elongated circumferentially and are connected to the mounting plate through the medium of reduced neck regions, whereby such circumferentially elongated portions may freely flex around radial axes. In the preferred form of the invention, this flexing takes place between the individual facing pads and thus the friction faces of the pads may remain parallel to the friction faces of the coacting clutch members between which they are compressed so that the thickness of the pads as they wear down may remain as uniform as possible.

Other objects, the advantages and uses of the invention will become more apparent after reading the following specification and claims, and after consideration of the drawings forming a part of the specification, wherein:

Fig. 1 is a fragmentary elevation of a clutch plate embodying the invention;

Fig. 2 is a sectional view thereof taken as indicated by the line 2—2 of Fig. 1;

Fig. 3 is a sectional view of one sector thereof taken as indicated by the line 3—3 of Fig. 1, shown in the position of initial engagement;

Fig. 4 is a sectional view similar to Fig. 3, with the clutch in fully engaged position;

Fig. 5 is an elevation of one sector of a clutch embodying a modified form of the invention;

Fig. 6 is a plan view thereof taken as indicated by the line 6—6 of Fig. 5;

Fig. 7 is a fragmentary elevation of a clutch plate embodying another modification of the invention;

Fig. 8 is a radial sectional view thereof taken as indicated by the line 8—8 of Fig. 7;

Fig. 9 is a fragmentary elevation of a clutch plate embodying another modification of the invention;

Fig. 10 is a radial sectional view thereof taken as indicated by the line 10—10 of Fig. 9;

Fig. 11 is a sectional view of one of the sectors of Fig. 9 taken as indicated by the line 11—11 of Fig. 9; and Fig. 12 is a sectional view, taken in the same manner as Fig. 11 of a sector of a clutch plate embodying another modified form of the invention.

As an illustration of one form in which the invention may be embodied, we have shown in Figs. 1, 2, 3 and 4, portions of a clutch plate embodying a hub 10, having a radially projecting flange 11, an annular mounting plate 12 mounted upon the hub 10 through the medium of torsional vibration dampener mechanism 13, a series of light-weight cushions 14 of thin yieldable sheet metal, secured as by means of rivets 15 to the mounting plate 12, and friction facing pads 16 and 17 respectively mounted on each side of each cushion 14.

The mounting plate 12 projects from the hub substantially to the inner boundary of the friction facing pads 16, 17, but is terminated short of the facing pads, i. e., does not project between them. The cushions 14 serve as the sole means of connecting the facings to the mounting disc 12. Ample strength for resisting the torsional loads imposed upon the plate, is provided by positioning the circumference on which the cushions 14 are attached to the mounting plate by the rivets 15, relatively near the inner boundary of the friction facing pads.

In order to secure maximum flexibility, the facing pads 16 and 17 are arranged with radial spaces 18 between them, and the cushions 14 are connected to the mounting disc 12 through the medium of reduced neck regions 19, the cushioning portion of each cushion being thereby provided with circumferentially extending wings 20 which are separated from the mounting disc 12, and therefore, free to flex along radial lines registering with the spaces 18. Thus, the flexing takes place between the facing pads, and the pads themselves are not required to flex. Furthermore, as a result of this arrangement, the pads may at all times maintain parallelism with the plane of the friction faces 21 and 22 of the coacting clutch members between which the plate is compressed. In the preferred form of the invention, the pads 16 and 17 are in the form of strips radially arranged and molded upon the cushion 14. However, they may be in the form of rows of buttons 16a and 17a separated by spaces 18a, as shown in Fig. 5.

The cushions 14 are flat and disposed in a common plane. The facing pads 16 are thicker than the pads 17. On one side of the cushion, a thick pad 16 is disposed between two thin pads 17. On the other side of the cushion, two thick pads 16 are disposed on either side of thin pad 17. Thus, the thick and thin pads are alternately arranged, with a thick pad on one side opposite a thin pad and staggered with relation to a thick pad on the other side, whereby as pressure is brought to bear against the pads by the friction faces 21 and 22, the thicker pads may be moved in the direction in which pressure is applied so as to allow the faces 21 and 22 to engage the center pads. In Fig. 3, the parts are shown in the position of initial engagement, wherein the thinner pads 17 are spaced from the faces 21 and 22 of the pressure members. In Fig. 4, the pads have been moved under the pressure of clutch engagement so that their friction faces have all become aligned in the common plane of the faces 21 and 22, thus giving full engagement. In reaching these positions, the facings have forced the normally flat cushion 14 into the distorted shape shown in Fig. 4.

As a result of the arrangement wherein a thick pad 16 on one side is opposed to a thin pad 17 on the other side, the friction face of each thin pad 17 is, prior to its engagement with a cooperating friction face 21 or 22, maintained in parallelism with such cooperating face by the contact of its opposed pad with a coacting friction face. Thus, the faces of the pads are at all times maintained in parallelism with their coacting friction faces, and as a result, each pad will wear down so as to maintain uniform thickness at all times.

The preferred mode of attaching the pads of the type shown in Fig. 1 to their cushion members 14, is by molding each pad integrally with its opposed pad on the other side of the side of the cushion, causing them to be connected by core portions 23 extending through openings 24 in the cushion and web portions 25 and 26 extending around the radially outer and inner edge regions of the cushions respectively. In the form shown in Fig. 5, the buttons 16a and 17a are likewise molded and connected to an opposed button by a core portion 23a extending through an opening in the cushion 14a. As an alternative mode of construction, the buttons 16a may be in the form of cores forced under compression into the openings 24a.

In the form of the invention shown in Fig. 7, the facing elements are in the form of radially separated rings 16b and 17b, secured to an annular array of circumferentially separated radially extending cushion fingers 14b. As the facing rings 16b are compressed between the driving members, the fingers 14b will be distorted so as to allow the friction faces of the rings 16b and 17b, which are alternately thick and thin, to move into registering planes, bringing all friction faces into contact with their coacting friction faces. In thus flexing, the fingers 14b bend along circumferential lines or, more strictly speaking, along chordal lines disposed in the spaces 18b between the rings 16b and 17b.

In the form of the invention shown in Figs. 9, 10 and 11, each facing covers the entire area of the cushioning portion of a cushion 14c. Each facing has alternating thick regions 16c and thin regions 17c, the thick regions gradually merging into the thin regions. As in the preferred form of the invention, the thick and thin regions are positioned in circumferential array, and any given radial cross-section of a facing is uniform in thickness. Thus, the flexing of the flat cushion 14c takes place along radial lines on either side of the reduced neck region 19c.

The facings in this form of the invention are secured to the cushion 14c by films of adhesive 27.

In the form of the invention shown in Fig. 12, the facings are of uniform thickness, and are secured by films of adhesive to a cushion 14d which is circumferentially undulated as shown. The high regions 16d and low regions 17d are formed by the conforming of the facings to the cushion which is undulated as shown. In other respects, the construction of this form of the invention is the same as that of Figs. 9, 10 and 11.

We claim:

1. In a friction clutch plate, an uninterrupted cushion element of thin flat resilient sheet metal, and a series of circumferentially spaced alternately thick and thin separate facing elements secured to each side of said cushion element and adapted to be engaged between flat friction faces of coacting clutch elements, with the thicker facing elements alone being initially engaged and the cushion elements becoming deformed under such initial engagement so as to bring the thinner facing elements into engagement with said coacting clutch element.

2. In a friction clutch plate, an uninterrupted cushion element of thin flat resilient sheet metal, a series of circumferentially spaced separate facing elements secured to each side of said cushion element and presenting alternately high and low friction faces adapted to be engaged between flat friction faces of coacting clutch members, with the high face alone being initially engaged and the cushion elements becoming deformed under such initial engagement so as to bring the low faces into engagement with said coacting clutch element.

3. A friction clutch plate as defined in claim 2, wherein said facing elements are molded upon said cushion elements.

4. A friction clutch plate comprising a mounting member, a plurality of thin flat cushion elements of resilient sheet metal each including a central region formed with a reduced neck secured to the peripheral region of said mounting member and freely flexible wing portions projecting circumferentially on either side of said central region, and a plurality of circumferentially spaced thick and thin facing elements secured to opposite sides of said central region and wing portions respectively and adapted both to be engaged by flat friction faces of coacting clutch elements, with the thicker friction facing alone being engaged initially and the cushion elements adapted to be deformed under pressure of the thicker elements so as to bring the thinner elements into engagement with said coacting clutch elements.

5. In a friction clutch plate, mounting means including a central disc portion of relatively non-yielding construction and a peripheral portion comprising a plurality of circumferentially separate relatively thin flat yieldable cushion elements lying in a common plane, each including a circumferentially narrowed neck portion attaching it to said central disc portion and a circumferentially enlarged freely flexible cushioning portion, and a plurality of alternately thick and thin circumferentially spaced facing elements secured to each of said cushion elements on each side thereof and adapted to be engaged between the flat friction faces of coacting clutch elements, with the thicker facing elements alone being initially engaged and the cushion elements becoming deformed under pressure applied to said thicker elements so as to bring said thinner facing elements into engagement with said coacting clutch elements.

6. In a friction clutch, mounting means including a central disc portion of relatively non-yielding construction and a peripheral portion comprising a plurality of separate thin yieldable cushion elements, circumferentially spaced and lying in a common plane, and a plurality of relative narrow facing strips secured upon each side of each cushion element, said strips extending in a generally radial direction presenting alternately high and low friction faces and being circumferentially spaced from each other, and a pair of coacting clutch elements having flat friction surfaces adapted to engage said facing elements under pressure, the higher faces being engaged initially and the cushion elements becoming deformed under such initial engagement so as to bring the lower faces into engagement with said coacting clutch elements.

7. In a friction clutch, a mounting means including a central disc portion of relatively non-yielding construction and a peripheral portion comprising a plurality of separate thin yieldable cushion elements each including a central region formed with a reduced neck attached to said central disc portion and a pair of freely flexible wings extending circumferentially on either side of said central region, and a plurality of circumferentially narrow facing strips secured to said cushion elements, including a pair of central facing strips secured to the respective sides of said central region and extending radially and a pair of facing strips secured to the respective sides of each of said wing portions and extending in circumferentially spaced parallel relationship to said central facing strips, said strips alternately presenting high and low regions of contact with coacting clutch elements with the high regions adapted to become engaged initially and the cushion elements becoming deformed under such initial engagement.

8. In a friction clutch, mounting means including a central region of relatively non-yielding construction and a peripheral region comprising a plurality of separate thin yieldable cushion elements each including a central portion formed with a reduced neck attached to said central region and a pair of freely flexible wings extending circumferentially on either side of said central portion, a series of separate facing elements secured respectively to said central portion and each of said wings on both sides of said cushion element, said facing elements presenting friction faces that are alternately high and low and spaced from each other circumferentially, said friction faces being adapted to be engaged between flat friction surfaces of coacting clutch members, with the high faces alone being initially engaged and the cushion elements becoming deformed under such initial engagement so as to bring the low faces into engagement with said coacting clutch surfaces.

9. In a friction clutch, mounting means including a central region of relatively non-yielding construction and a peripheral region comprising a plurality of separate thin yieldable cushion elements each including a central portion formed with a reduced neck attached to said central region and a pair of freely flexible wings extending circumferentially on either side of said central portion, and facing means secured to said cushion elements and presenting on each side of each cushion element a series of friction faces, including a central face registering with said central portion of the cushion and a face spaced circumferentially from said central face on each side thereof and registering with the respective wing portions of said cushion, said faces being alternately high and low so as to present alternately high and low regions of contact with flat friction surfaces of coacting clutch elements, with the high regions being initially engaged and the cushion elements becoming deformed under such initial engagement so as to bring the low faces into engagement with said coacting clutch elements.

10. In a friction clutch, mounting means including a central region of relatively non-yielding construction and a peripheral region comprising a plurality of separate thin yieldable cushion elements each including a central portion formed with a reduced neck attached to said central region and a pair of freely flexible wings extending circumferentially on either side of said central portion, and facing means secured to said cushion elements and providing on each side of each cushion element a plurality of radially extending circumferentially narrow friction faces, one registering with the central portion of the cushion and one registering with each of the side wings of the cushion, said faces being alternately high and low and spaced from each other in a circumferential direction so as to present alternately high and low regions of contact with flat friction surfaces of coacting clutch elements, with the high regions adapted to become engaged initially and the cushion elements adapted to become deformed under such initial engagement so as to bring the low faces into engagement with said coacting clutch elements.

HAROLD NUTT.
HAROLD V. REED.